United States Patent
Horak

(10) Patent No.: US 7,372,773 B2
(45) Date of Patent: May 13, 2008

(54) METHOD AND SYSTEM OF PROVIDING CLUSTERED NETWORKS OF BEARING-MEASURING SENSORS

(75) Inventor: Dan T. Horak, Ellicott City, MD (US)

(73) Assignee: Honeywell International, Inc., Morristown, NJ (US)

( * ) Notice: Subject to any disclaimer, the term of this patent is extended or adjusted under 35 U.S.C. 154(b) by 362 days.

(21) Appl. No.: 11/102,219

(22) Filed: Apr. 8, 2005

(65) Prior Publication Data

US 2006/0227664 A1    Oct. 12, 2006

(51) Int. Cl.
*G01S 3/80* (2006.01)
(52) U.S. Cl. .................. 367/129; 367/124; 367/118
(58) Field of Classification Search ............... 367/118, 367/124, 129
See application file for complete search history.

(56) References Cited

U.S. PATENT DOCUMENTS 5,504,717 A * 4/1996 Sharkey et al. ............. 367/124
5,703,835 A * 12/1997 Sharkey et al. ............. 367/124
6,178,141 B1 * 1/2001 Duckworth et al. ........ 367/127
6,690,321 B1 * 2/2004 Blatt ........................... 367/124

* cited by examiner

*Primary Examiner*—Ian J. Lobo
(74) *Attorney, Agent, or Firm*—Black Lowe & Graham PLLC

(57) ABSTRACT

System and method for determining a location of a first target. The sensor network comprises a first sensor cluster comprising a first plurality of bearing measuring sensors. A first gateway is operatively coupled to the first plurality of bearing measuring sensors. A second sensor cluster comprises a second plurality of bearing measuring sensors. A second gateway is operatively coupled to the second plurality of bearing measuring sensors. A central command node is operatively coupled to the first and the second gateways. A first limited set of pre-computed numbers representative of information for generating a global target location estimation is transmitted from the first gateway to the central command node. A second limited set of pre-computed numbers representative of information for generating the global target location estimation is transmitted from the second gateway to the central command node. A global target location estimate of the first target is computed by the central command node based on the first and second limited set of pre-computed numbers.

11 Claims, 5 Drawing Sheets

METHOD AND SYSTEM OF PROVIDING CLUSTERED NETWORKS OF BEARING-MEASURING SENSORS

BACKGROUND

1. Field of the Invention

The present invention is generally directed to bearing measuring sensors. More particularly, the present invention is directed to methods and systems for providing at least one clustered network of bearing measuring sensors. The invention is particularly useful in utilizing at least one clustered acoustic bearing sensor network for estimating a target location. For example, the present invention may be used for estimating a target location of a ground or an airborne asset. However, aspects of the invention may be equally applicable in other scenarios as well.

2. Description of Related Art

Acoustic sensing technology can be used effectively by the various armed services of the United States of America for detecting and tracking ground and airborne assets. For example, acoustic sensing technology allows the acoustic sound emitted by ground vehicles, helicopters, aircraft and the like to be passively detected without certain line-of-sight restrictions. Such line-of-site restrictions may arise with other conventional tracking systems, such as radar and/or optical systems. Acoustic sensing technology may also be employed for a variety of civilian uses as well. For example, one such application could involve providing a low-cost, passive, aircraft tracking capability for small airports where radars are not practical and/or cost effective.

As is generally known, acoustic bearing sensors measure a bearing angle from a sensor to a target using an array of three or more microphones. An acoustic bearing sensor generally refers to an assembly comprising an array of microphones. Theoretically, once two sensors determine a bearing angle to a target, geometric triangulation can be used to determine the target location. For example, FIG. 1 illustrates a conventional two sensor arrangement 10. As shown in FIG. 1, two bearing sensors 12, 14 are provided in a conventional sensor arrangement and are arranged to establish a target location of target 16. This arrangement 10 utilizes a triangulation method to derive target location information. Triangulation in this simple two-sensor case consists of determining the intersection of the two bearing lines. The estimated location of the target is at the intersection.

A typical acoustic bearing sensor determines the bearing (or azimuth) to target by analyzing acoustic sound waves 18 that target 16 emits. Such acoustic sound waves 18 could include an engine noise, a muffler noise, a tire-road noise, or other like acoustic sounds. Muffler noise is a dominant noise that is typically detected in most situations. Therefore, particular acoustic sensors are used to track or locate targets having engines (and/or wheels) such as trucks, tanks, airborne crafts such as helicopters and airplanes, and the like.

One concern with acoustic bearing sensors is that they possess a random bearing angle measurement error and therefore cannot be used with the simple triangulation method as illustrated in FIG. 1. Such a random bearing angle measurement error could have a standard deviation of three degrees (i.e., 3°) or more and this standard deviation can cause an uncertainty area when determining a location of a target, such as target 16. Consequently, accurate generation of target location information is difficult.

FIG. 2 illustrates an arrangement 20 of two sensors 22, 24 having a potential uncertainty area 19 in determining the location of target 16 based on acoustic sound waves 18. The uncertainty area is due to an uncertainty of the bearing direction estimates of the two sensors. The two bearing lines originating from each sensor define the uncertainty of the bearing angle estimate. The correct bearing directions are somewhere in between the two lines. When the two bearing lines from each sensor intersect the two bearing lines from the other sensor, they define a quadrilateral (a polygon with 4 sides) which represents the uncertainty area 19 of the target location estimate. While the target 16 is at a specific location, the triangulation of the bearing estimates of the sensors 22, 24 would estimate the target location at a random point that could be anywhere within the uncertainty area 19.

Consequently, depending on a distance between sensor and target, a large and therefore unacceptable uncertainty area 19 may be present. As just one example, in the event that an acoustic sensor is positioned at a distance of 500 meters from target 16, the three degree angular error translates into a linear target location error with a standard deviation ($\sigma$) of 500 meters×tan(3°), or approximately 26.2 meters. Assuming that a random variable can frequently reach its $\pm 3\sigma$ values, a linear uncertainty such as uncertainty area 19 can approach $\pm 3 \times 26.2$ m=$\pm 78.6$ meters in magnitude. Such a linear uncertainty on the order of almost 80 meters is considered too large of an uncertainty for certain applications, such as most target tracking applications since there may be a desire to intercept a target with a weapon and the weapon will miss the target if the target is substantially smaller than this uncertainty area. These error estimates are derived assuming optimal sensor geometry where the two bearing lines intersect perpendicularly. Sub-optimal sensor geometry results in even larger linear errors, as do longer sensor-to-target distances. When the two bearing lines intersect approximately perpendicularly, as in FIG. 2, the uncertainty area is a quadrilateral (polygon with 4 sides) that is close in shape to a square and the errors are approximately equal in all directions. When the bearing lines intersect with a small angle, such as on the order of 10°, the uncertainty area becomes a very long and thin quadrilateral. Consequently, the errors in the direction where the uncertainty area is very long can be quite large, for example, several times the $\pm 78.6$ meter error estimate from above.

One method of overcoming this concern of large location estimation errors is to estimate a target location using a plurality of bearing sensors. For example, in one arrangement, a plurality of sensors on the order of hundreds or even thousands of bearing sensors may be networked together to produce a global target location estimate, that is, a target location estimate generated by input from many bearing sensors. Using such a large quantity of bearing sensors with each bearing sensor having an independent random bearing error will average out these random errors and therefore lead to a more accurate global target location estimate.

For example, FIG. 3 illustrates a bearing sensor network 50 comprising a single cluster 68 comprising a plurality of bearing sensors. In this arrangement, the triangulation method of FIG. 2 is replaced with an optimization that can use a large number of sensors. More particularly, network 68 comprises six sensors 52, 54, 56, 58, 60, and 62 and these sensors are all operatively coupled to a central computing node 70. Network 50 of six bearing sensors 52, 54, 56, 58, 60, and 62 illustrated in FIG. 3 could include hundreds or even thousands of sensors. This network could also be disbursed over a large land mass, for example, a land mass on the order of tens or even hundreds of square kilometers.

One approach to locating target 64 in FIG. 3 is to utilize an expanded sensor network and transmit a bearing measurement of each sensor 52, 54, 56, 58, 60, and 62 to a central computing node 70. Central computing node 70 then gathers bearing measurements generated by each of the plurality of bearing sensors 52, 54, 56, 58, 60, and 62 and utilizes a global optimization to estimate a global target location estimate of target 64. In the absence of a global optimization, each pair of bearing sensors in FIG. 3 would estimate a different target location based on triangulation of their two bearing lines. The intersections of these pairs of bearing lines are marked by the circles in FIG. 3. However, it is preferred to estimate one globally optimal location of the target that is based on the measurements of all the sensors rather than computing multiple estimates based on each pair of sensors. The one globally-optimal location is the most accurate estimate that can be derived based on the mathematics and physics of this target location problem.

Typically, sensors measure bearing angles about once per second and target location estimates are computed at the same rate (i.e, 60 estimates per minute). Therefore, a centralized sensor network control approach requires high communication bandwidth so that each sensor in the network can transmit wirelessly its bearing estimate to the central computing node 70 once per second. It is likely that this would result in wireless communication bottlenecks and not all sensor measurements would reach central computing node 70 in time for the once-per-second computation of the target location. Such a centralized sensor network approach would also be more prone to failures when sensors or entire regions of the sensor network fail because the central computing node 70 would have to resolve these problems while possibly located many kilometers away from the location of the problem.

There is, therefore, a general need for a method and/or system that provides a means of optimally estimating a target location using bearing measurements, preferably from a plurality of sensors. There is a further need to provide a means of optimally estimating a target location using bearing measurements from a plurality of sensors while minimizing the required communication within the network so that the information from all the sensors can reach the central computing node in time for target location computation. There is a further need to make the sensor network more robust to local sensor failures and to communication failures by making the network less centralized, i.e., by managing clusters of sensors locally and allowing the central computing node to deal with a limited number of clusters rather than to deal individually with every single sensor in the network.

SUMMARY

According to an exemplary embodiment, a sensor network comprises a first sensor cluster comprising a first plurality of bearing measuring sensors. A first gateway is operatively coupled to the first plurality of bearing measuring sensors. A second sensor cluster comprises a second plurality of bearing measuring sensors. A second gateway is operatively coupled to the second plurality of bearing measuring sensors. A central command node is operatively coupled to the first and the second gateways. A first limited set of pre-computed numbers representative of information for generating a global target location estimation is transmitted from the first gateway to the central command node. A second limited set of pre-computed numbers representative of information for generating the global target location estimation is transmitted from the second gateway to the central command node. A global target location estimate of the first target is computed by the central command node based on the first and second limited set of pre-computed numbers.

In an alternative arrangement, the network further comprises a second target and a third limited set of pre-computed numbers representative of information for generating a global target location estimation of the second target. The third limited set of pre-computed numbers is transmitted from the first gateway to the central command node. A fourth limited set of pre-computed numbers is transmitted from the second gateway to the central command node. A global target location estimate of the second target is then computed by the central command node based on the third and the fourth limited sets of pre-computed numbers.

In an alternative arrangement, a method of computing a location of a first target in a sensor network comprises the steps of defining a first network cluster with a first plurality of bearing measuring sensors and operatively coupling the first network cluster to a first gateway. A second network cluster is defined with a second plurality of bearing measuring sensors and operatively coupling the second network cluster to a second gateway. The first and second gateways are operatively coupled to a central command node. The method further comprises the steps of transmitting a first set of pre-computed numbers representative of information needed for global target location estimation of the first target from the first gateway to the central command node; and transmitting a second set of pre-computed numbers representative of information needed for global target location estimation of the first target from the second gateway to the central command node. The location of the first target is estimated by the central command node based in part on the first and the second limited set of pre-computed numbers.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION

Figure 1:
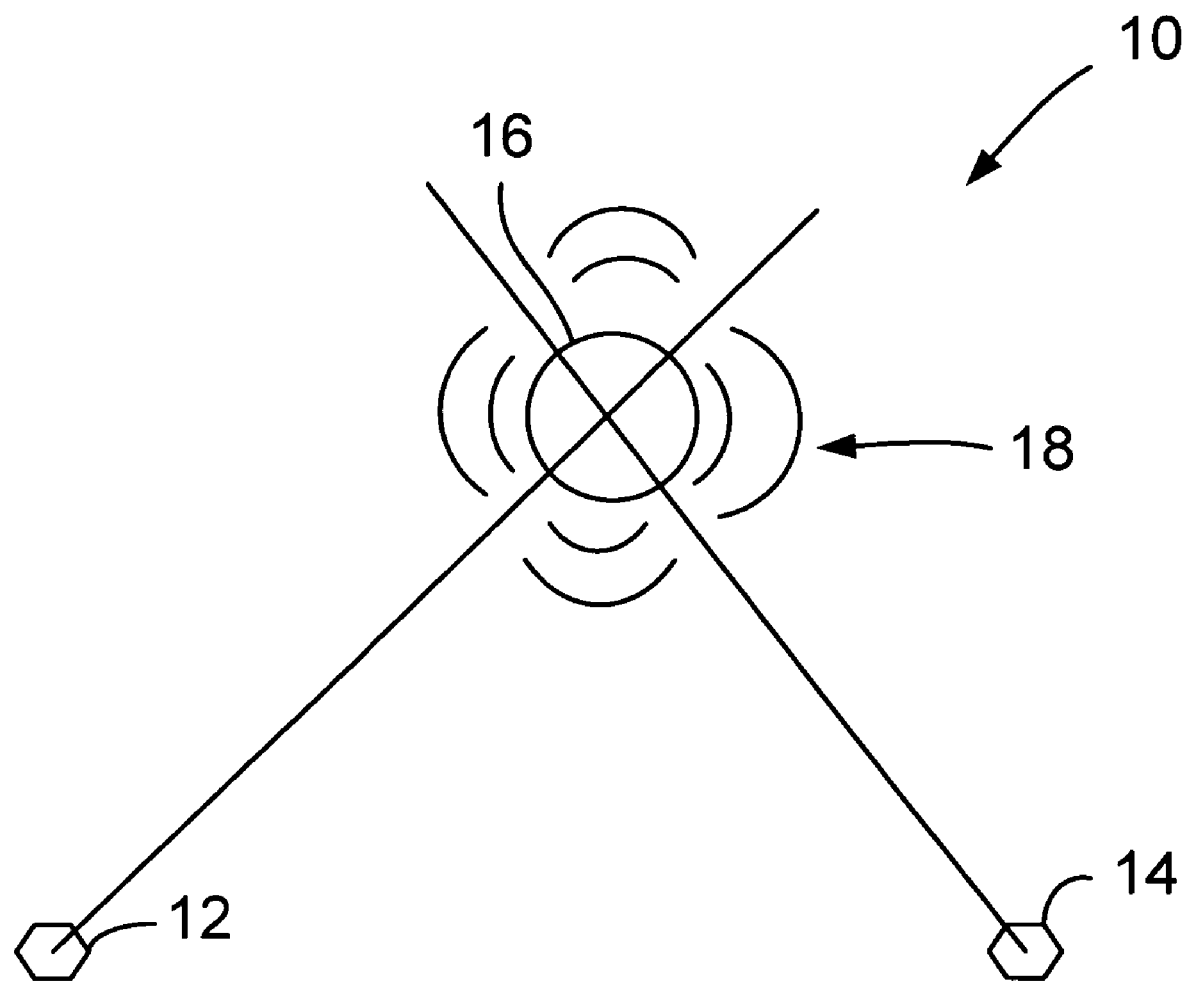
FIG. 1 is a block diagram comprising two bearing sensors and establishing target location information based on a triangulation method.
Figure 4:
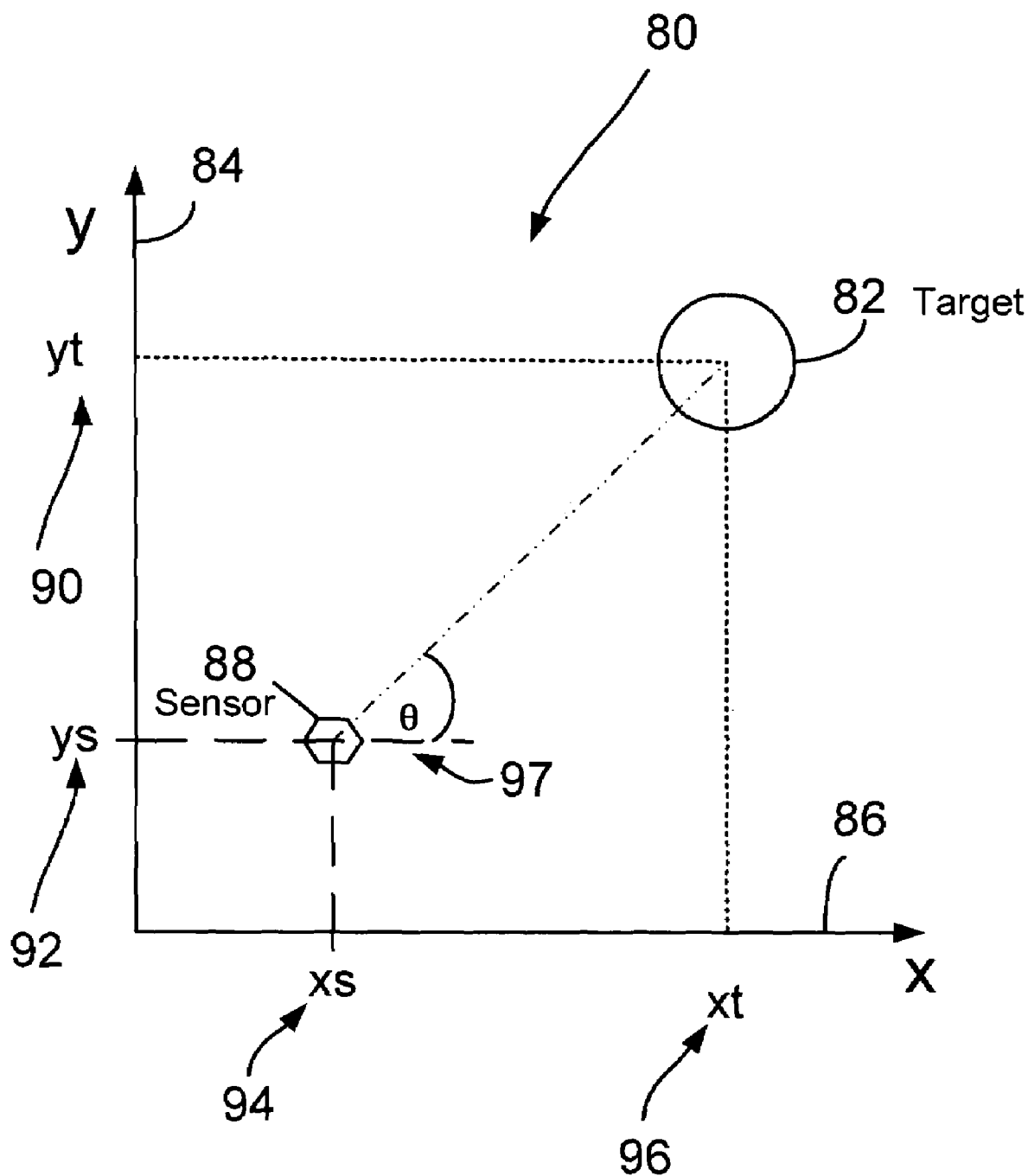
FIG. 4 is a graph illustrating a target bearing calculation of one of the plurality of bearing sensors illustrated in FIG. 3.

FIG. 4 illustrates a sensor 88 and a target 82 in an x-y coordinate system 80 and a bearing angle $\theta$ 97 that sensor is designed to measure. Preferably, sensor 88 illustrated in FIG. 4 comprises a bearing measuring sensor, such as an acoustic bearing sensors illustrated in FIG. 1. An acoustic bearing sensor is one preferred type of sensor because it can detect vehicular targets that are up to two kilometers away and such sensors are generally inexpensive. Therefore, networks where a target is sensed by many sensors simultaneously (on the order of a few dozen to an order of a few thousand) can be generally practical from both a cost and logistics perspective. These types of sensors are also generally small devices (typically, on the order of 10 to 20 centimeters in diameter), are to be located on the ground, and comprise a small communications antenna and small batteries. Wireless communication range of such sensors is typically short and the communication bandwidth ("baud rate") is therefore also low. For example, a typical acoustic senor may have wireless communication range of approximately 100 meters.

An acoustic sensor's operational life is limited by the battery capacity which is dependent on duty cycle. For example, a typical acoustic sensor may have an operational life at 100% duty cycle of 2 months, a life of 2 years at a 10% duty cycle and a life of over 3 years at a 1% duty cycle. One type of such sensor is the acoustic surveillance unit (ASU) offered by Signal Systems Corporation of Severna Park, Md. and is herein entirely incorporated by reference.

Aside from acoustic bearing sensor arrangements, sensor 88 may comprise alternative types of bearing sensing mechanisms aside from an acoustic bearing sensor. For example, bearing measurements may be taken with laser pointing target markers, imaging systems, seismic sensors, radar, sonar (in underwater applications), and the like. The imaging systems may also be implemented with visual light or be infrared (and display temperature of the object being imaged).

In one preferred arrangement where sensor 88 comprises an acoustic bearing sensor, target 82 to be located may comprise a ground and/or an airborne asset. Alternatively, where sensor 88 does not comprise an acoustic bearing sensor (and therefore is not sensing or detecting acoustic sound waves), the system may be computing bearing angles for non-noise generating targets such as a human target, or an animal based on an imaging sensor such as an infrared camera.

Returning to FIG. 4, it may be seen that:

$$(y_t - y_s) \cot \theta = x_t - x_s \quad (1)$$

or, rearranging Eq. (1), it may be seen that $$x_t - y_t \cot \theta = x_s - y_s \cot \theta \quad (2)$$

where $x_s$, $y_s$ are the known location coordinates of the sensor, $\theta$ is the bearing measurement provided by the sensor, and $x_t$, $y_t$ are the coordinates of the target. For sensor number i, the following are defined:

$$a_i = \cot \theta_i$$

$$b_i = x_i - y_i \cot \theta_i \quad (3)$$

where the subscript i, referring to specific sensor number i, replaced the subscript s that referred in Eq. (2) to any sensor.

Let x be the optimal estimate of $x_t$ and let y be the optimal estimate of $y_t$. Let a subset of a sensor network be called a cluster. For example, in a sensor network of 500 sensors a cluster may include a subset of 100 sensors that are geographically close to each other. Then, for all m sensors in a cluster, it can be determined that $$x - a_1 y = b_1$$

$$x - a_2 y = b_2$$

$$x - a_i y = b_i$$

$$x - a_m y = b_m \quad (4)$$

This set of m equations can be solved via least squares optimization by minimizing $\Sigma[v_i(x - a_i y - b_i)^2]$, i=1, . . . ,m, where $v_i \geq 0$ are weights that determine the relative significance of the m equations. In one approach, if all sensors are deemed generally equal, all m terms of vector v could be set to 1. In certain arrangements, some sensors will be known to generate errors smaller than others, and their weights will be set higher than the weights of the noisy sensors. For example, if in a cluster of three sensors it is known that sensors 1 and 2 generate random bearing measurement errors that are twice as large as the errors generated by sensor 3, the weights of sensors 1 and 2 could be set to 1 and the weight of sensor 3 could be set to 2. This would assure that the target location estimate depends more on the low-noise sensor 3 than it depends on either sensor 1 or sensor 2.

The cot $\theta$ terms in Eq. (3) approach infinity as $\theta$ approaches 0 or ±180°, thereby making the optimization sensitive to the mathematical formulation. Therefore, the above formulation can be used only for angles $135° \geq |\theta| \geq 45°$ and for all other values we use a tan $\theta$ formulation, as follows.

$$y_t - y_s = (x_t - x_s) \tan \theta \quad (5)$$

$$x_t \tan \theta - y_t = x_s \tan \theta - y_s \quad (6)$$

Let $$\alpha_i = \tan \theta_i$$

$$\beta_i = x_i \tan \theta_i - y_i \quad (7)$$

Then, for all n sensors in a cluster that use the tan $\theta$ formulation, the following equations may be used:

$$\alpha_1 x - y = \beta_1$$

$$\alpha_2 x - y = \beta_2$$

$$\alpha_j x - y = \beta_j$$

$$\alpha_n x - y = \beta_n \quad (8)$$

This set of n equations can be solved via least squares optimization by minimizing $\Sigma[w_j(\alpha_j x - y - \beta_j)^2]$, j=1, . . . ,n, where $w_j \geq 0$ are weights that determine the relative significance of the n equations.

Let there be m sensors in a cluster that use the cot $\theta$ formulation and n sensors that use the tan $\theta$ formulation. Let the weights be called v for the cot $\theta$ formulation and w for the tan $\theta$ formulation. This combined problem, defined by Eq. (4) and Eq. (8), can be solved by minimizing $\Sigma[v_i(x - a_i y - b_i)^2] + \Sigma[w_j(\alpha_j x - y - \beta_j)^2]$, i=1, . . . ,m; j=1, . . . ,n. The solution of this least square optimization problem can be expressed in a formula form because the optimization problem has a unique mathematical structure. The solution may be derived as follows:

$$x = [(\Sigma w + \Sigma \alpha^2)(\Sigma b + \Sigma \alpha \beta) + (\Sigma \alpha - \Sigma a)(\Sigma ab - \Sigma \beta)]/D$$

$$y = [(\Sigma v + \Sigma \alpha^2)(\Sigma ab - \Sigma \beta) + (\Sigma \alpha - \Sigma a)(\Sigma b + \Sigma \alpha \beta)]/D \quad (4)$$

where $$D = (\Sigma v + \Sigma \alpha^2)(\Sigma w + \Sigma a^2) + \Sigma \alpha - \Sigma a$$

and $$\Sigma a = a_1/v_1 + a_2 + \ldots + a_m/v_m$$

$$\Sigma b = b_1/v_1 + b_2/v_2 + \ldots + b_m/v_m$$

$$\Sigma a^2 = a_1^2/v_1 + a_2^2/v_2 + \ldots + a_m^2/v_m$$

$$\Sigma ab = a_1 b_1/v_1 + a_2 b_2 + \ldots + a_m b_m/v_m$$

$$\Sigma v = 1/v_1 + 1/v_2 + \ldots + 1/v_m$$

$$\Sigma\alpha = \alpha_1/w_1 + \alpha_2/w_2 + \ldots + \alpha_n/w_n$$

$$\Sigma\beta = \beta_1/w_1 + \beta_2/w_2 + \ldots + \beta_n/w_n$$

$$\Sigma\alpha^2 = \alpha_1^2/w_1 \alpha_2^2/w_2 + \ldots + \alpha_n^2/w_n$$

$$\Sigma\alpha\beta = \alpha_1\beta_1/w_1 + \alpha_2\beta_2/w_2 + \ldots + \alpha_n\beta_n/w_n$$

$$\Sigma w = 1/w_1 + 1/w_2 + \ldots + 1/w_n \quad (10)$$

It shall be noted that the optimal solution involves only expressions that are summations (i.e., $\Sigma$ terms) of the terms that define a cluster. If a sensor is added to a cluster, each summation would gain one more term. If an entire cluster of sensors is added to the first cluster, to form a 2-cluster network of sensors, each summation would gain as many terms as there are sensors in the second cluster.

This logic may be generalized to conclude that to derive the optimal solution for a network comprising any number of sensor clusters, the corresponding cluster summation terms should be summed. The combined solution then becomes $$x = \frac{1}{D}\left[\left(\sum_{c=1}^{k}\left(\sum w\right) + \sum_{c=1}^{k}\left(\sum a^2\right)\right)\left(\sum_{c=1}^{k}\left(\sum b\right) + \sum_{c=1}^{k}\left(\sum \alpha\beta\right)\right) + \left(\sum_{c=1}^{k}\left(\sum \alpha\right) - \sum_{c=1}^{k}\left(\sum a\right)\right)\left(\sum_{c=1}^{k}\left(\sum ab\right) + \sum_{c=1}^{k}\left(\sum \beta\right)\right)\right] \quad (11)$$

$$y = \frac{1}{D}\left[\left(\sum_{c=1}^{k}\left(\sum v\right) + \sum_{c=1}^{k}\left(\sum \alpha^2\right)\right)\left(\sum_{c=1}^{k}\left(\sum ab\right) - \sum_{c=1}^{k}\left(\sum \beta\right)\right) + \left(\sum_{c=1}^{k}\left(\sum a\right) - \sum_{c=1}^{k}\left(\sum a\right)\right)\left(\sum_{c=1}^{k}\left(\sum b\right) + \sum_{c=1}^{k}\left(\sum \alpha\beta\right)\right)\right]$$

where $$D = \left(\sum_{c=1}^{k}\left(\sum v\right) + \sum_{c=1}^{k}\left(\sum \alpha^2\right)\right)\left(\sum_{c=1}^{k}\left(\sum w\right) + \sum_{c=1}^{k}\left(\sum a^2\right)\right) + \sum_{c=1}^{k}\left(\sum \alpha\right) - \sum_{c=1}^{k}\left(\sum a\right)$$

In Eq. (11), each summation term has the general form $\Sigma(\Sigma u)$ where the inner term, $(\Sigma u)$, represents any one of the ten types of summations that each cluster computing node calculates, as detailed in Eq. (10), and the outer summation represents the summing of corresponding summation terms across all k clusters in the sensor network, performed at the central command node.

In summary, a central command node receives the ten quantities specified in Eq. (10) from each cluster, independently of the number of sensors in each cluster. These ten quantities are $\Sigma a$, $\Sigma b$, $\Sigma a^2$, $\Sigma ab$, $\Sigma v$, $\Sigma\alpha$, $\Sigma\beta$, $\Sigma\alpha^2$, $\Sigma\alpha\beta$ and $\Sigma w$. In a preferred arrangement, a central command node sums up corresponding quantities from all k clusters, to get the ten double summation quantities $\Sigma(\Sigma a)$, $\Sigma(\Sigma b)$, $\Sigma(\Sigma a^2)$, $\Sigma(\Sigma ab)$, $\Sigma(\Sigma v)$, $\Sigma(\Sigma\alpha)$, $\Sigma(\Sigma\beta)$, $\Sigma(\Sigma\alpha^2)$, $\Sigma(\Sigma\alpha\beta)$ and $\Sigma(\Sigma w)$. These ten double summation quantities plug directly into the formula solution, Eq. (11), of the least squares target location problem that combines the inputs from all the clusters in the network. In this manner, the amount of information that needs to be transmitted through the network is reduced using a mathematical reformulation of the target location determination problem because each cluster only needs to transmit ten numbers even if it includes thousands of sensors.

Acoustic bearing sensors can measure the bearing directions to multiple targets simultaneously. When more than one target are being detected by the sensors in the clusters, the method for computing the global target location estimate, summarized by Eq. (10) and Eq. (11) for a single target, is executed multiple times, once per target. For example, if three targets are being detected by clusters of sensors, the cluster gateways will each transmit 30 numbers to the central command node, ten numbers for each target where the ten numbers are defined by Eq. (10). The central command node will then combine the target location information from all the clusters for each of the three targets. Specifically, it will compute Eq. (11) for target 1, then for target 2 and then for target 3. These three computations are independent of each other.

Figure 5:
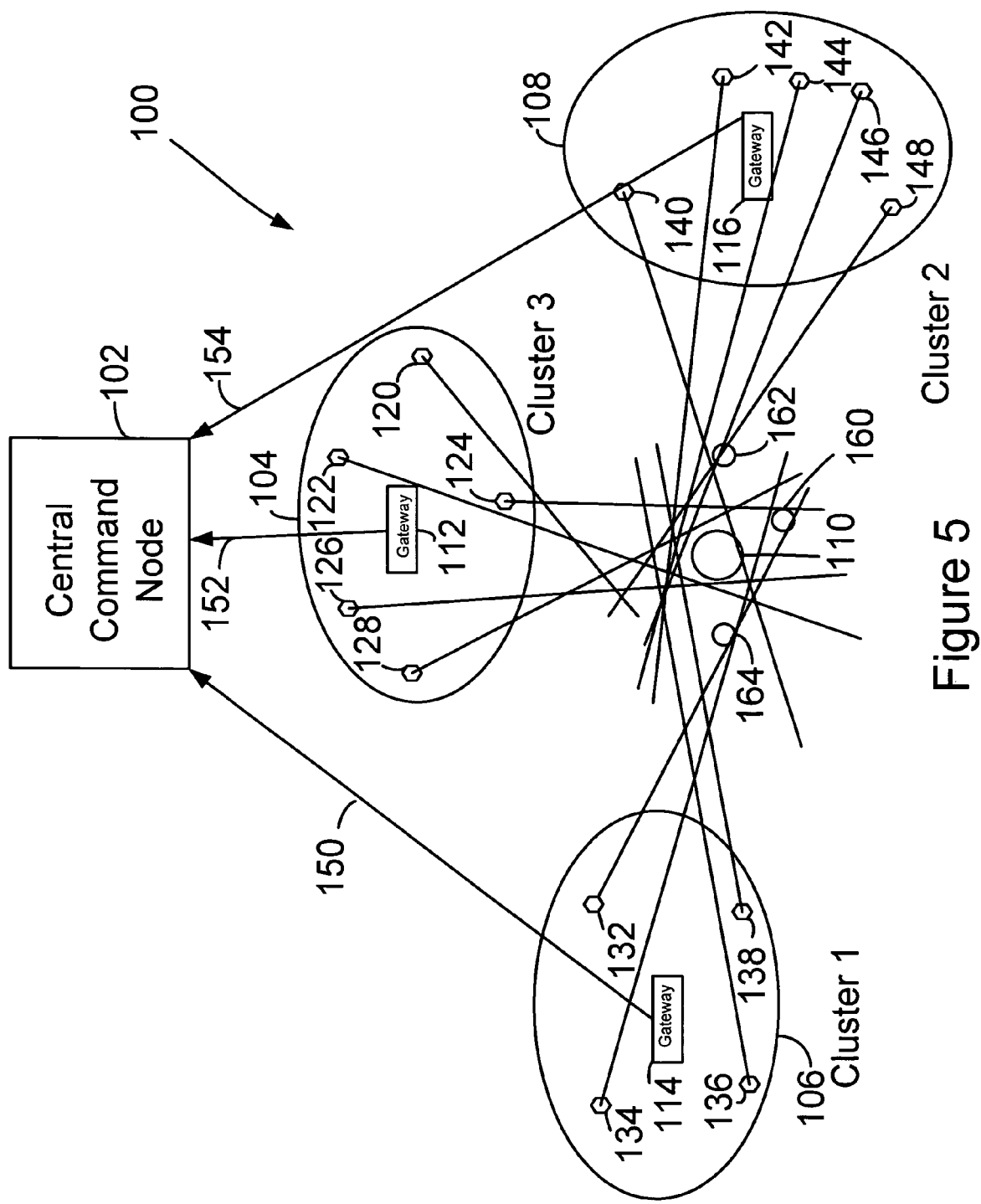
FIG. 5 is a block diagram of a plurality of bearing sensor clusters estimating a target location and networked to a central command node.

FIG. 5 illustrates a bearing sensor network 100 incorporating aspects of the present invention. Bearing sensor network 100 comprises a first sensor cluster 104, a second sensor cluster 106, and a third sensor cluster 108. Other cluster arrangements could also be used. Each cluster 104, 106, 108 has an associated gateway for performing sensor management within the cluster and for communication with central command node 102. For example, first sensor cluster 104 comprises first gateway 112, second cluster 106 comprises second gateway 114, and third cluster 108 comprises third gateway 116. All three gateways 112, 114, and 116 are operatively coupled to central command node 102. Central command node 102 may be stationary or movable and may be located far from the sensor clusters. Although only three clusters are illustrated in FIG. 5, those of ordinary skill in the art will recognize that alternative arrangements are possible including a network having more or less than three clusters. Typically, sensor clusters will have many more sensors than those sensors illustrated in FIG. 5.

The sensors are arranged in clusters 104, 106, and 108 so that each cluster has a gateway and it is this gateway that controls its respective cluster. Gateways are capable of computing the ten quantities defined in Eq. (10) based on the sensors in its respective cluster. For example, with respect to first cluster 104, this cluster comprises four sensors 120, 122, 124, 126, and 128. Receiving target location information from these five clusters, gateway 112 can compute a local estimate target location 160. Similarly, with respect to second cluster 106, this cluster comprises four sensors 132, 134, 136, and 138. Receiving target location information from these four sensors, gateway 114 of cluster 106 can compute its local estimate target location 162. The gateway 116 of third cluster 108 can compute its local estimate target location 164 in a similar fashion from sensors 140, 142, 144, 146, and 148.

Figure 2:
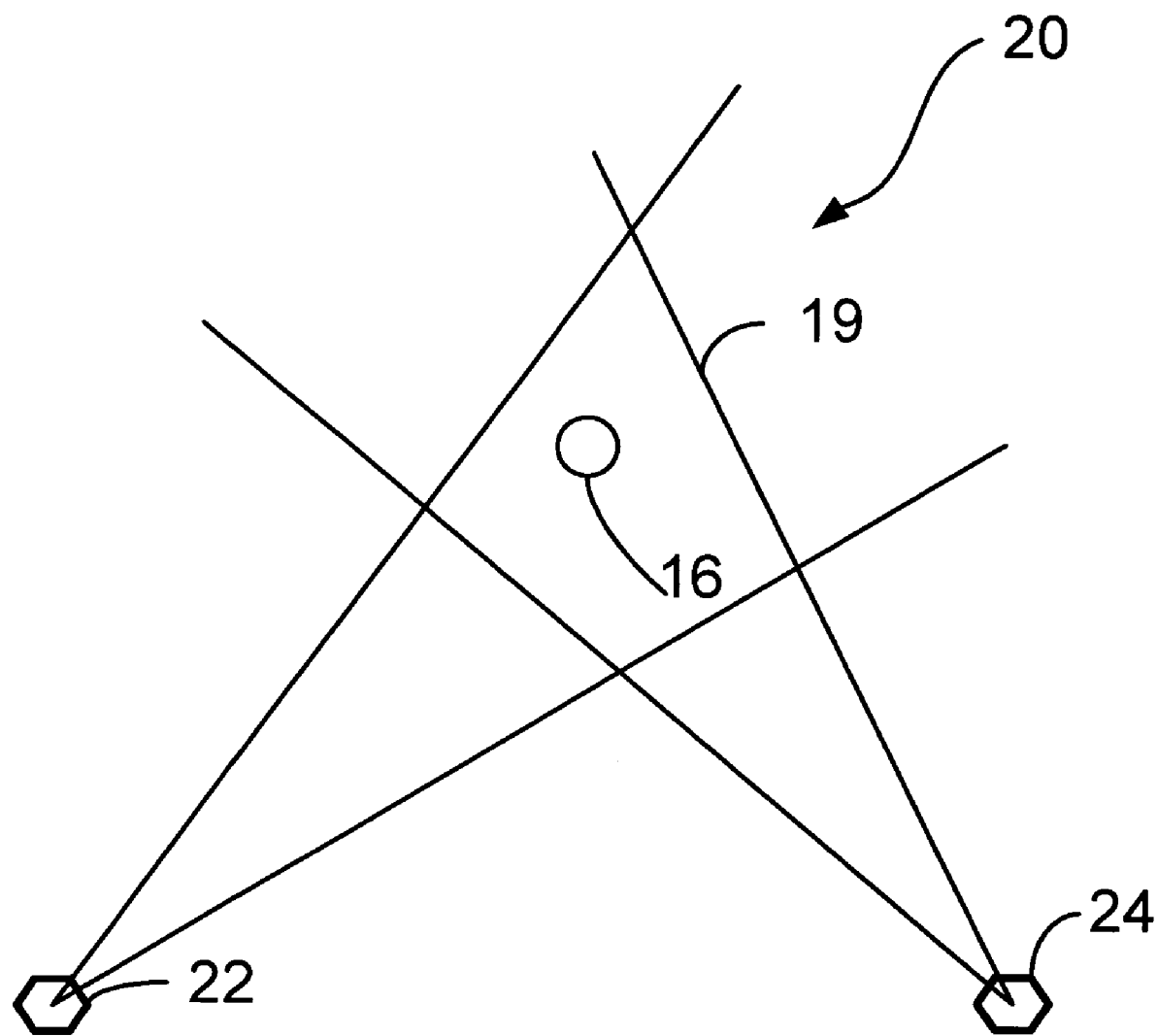
FIG. 2 is a block diagram comprising two bearing sensors and illustrating a target location uncertainty area.
Figure 3:
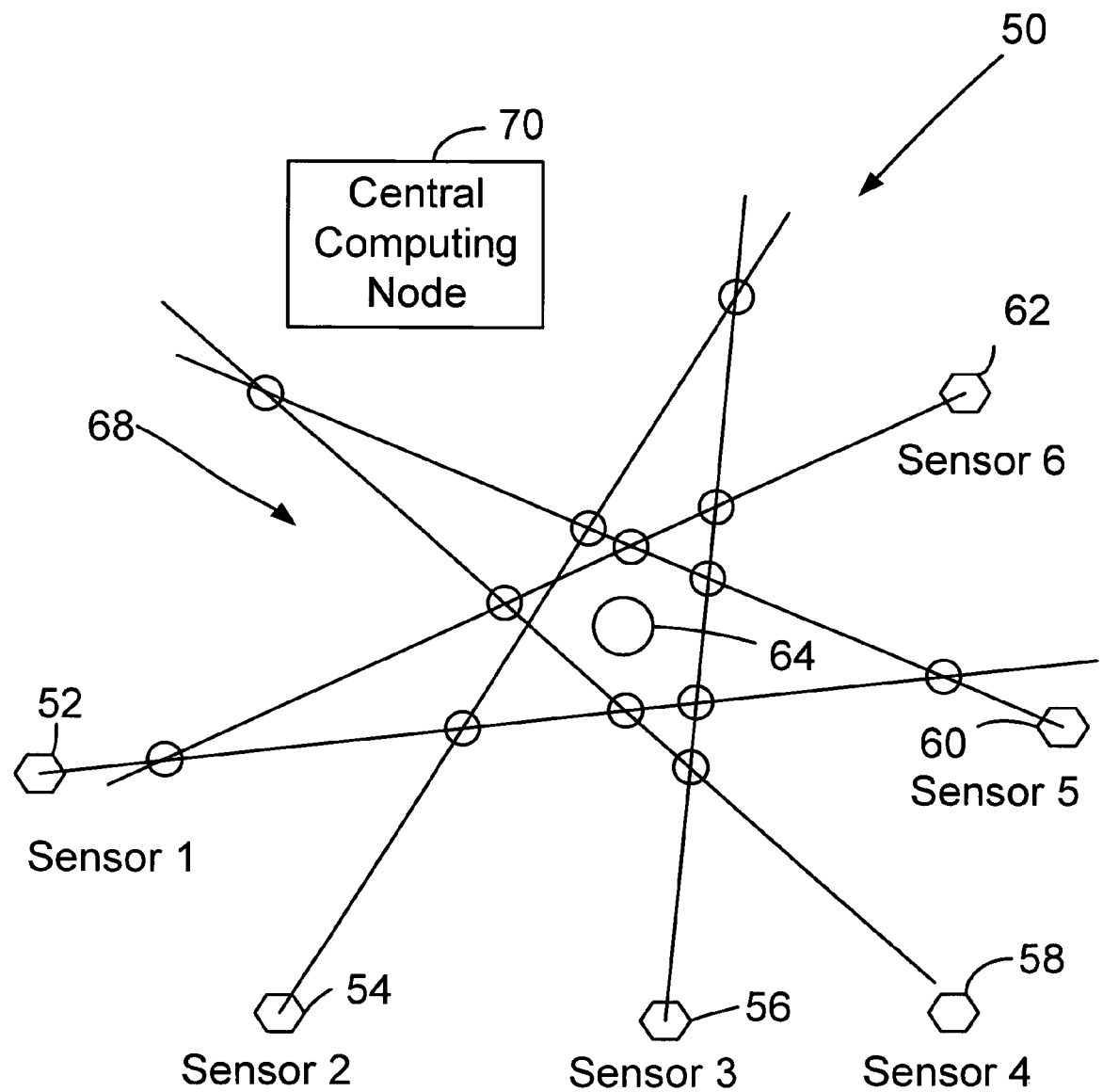
FIG. 3 is a block diagram of a network of bearing sensors estimating a target location.

However, the single-cluster estimates of the target location, 160, 162 and 164, are not globally optimal. Each cluster senses the acoustic sound waves emitted by target 110 from one general direction (i.e., cluster 104 is North of the target, cluster 106 is West of the target and cluster 108 is East of target 110) and, consequently, the target location estimate error of each cluster is high, as illustrated by the simple example in FIG. 2. It would be preferred if the target location was estimated globally by all the sensors in all the clusters in a coordinated fashion because then the target would be sensed from three general directions (i.e., North, West and East) simultaneously. The global estimate would be closer to the actual location of the target than any of the single-cluster estimates is. A preferred method for target location estimation in clustered sensor networks, summarized by Eq. (11), allows the central command node 102 to compute the global estimate without any approximations by receiving only a limited information from each cluster (here, only 10 numbers are transmitted from each cluster), thereby minimizing the communication requirements of the sensor network.

Each cluster 104, 106, and 108 further comprises a gateway. Each gateway is located generally centrally to each cluster. The location of the gateway within the cluster is a function of the wireless transmission capability of the sensors. Therefore, the greater the transmission capability of the sensors, the larger the cluster may be. In one preferred cluster arrangement, transmission of a sensor will be on the order of approximately 100 to 200 meters. In such an arrangement, a cluster would comprise those sensors that are successfully transmitting target information to the gateway within this range.

Network gateways preferably comprise a computing device that has the ability to process transmitted target information from a plurality of sensors making up the cluster. Gateway would also have processing abilities to thereby manage incoming data and perhaps assign a weight to each estimated bearing measurement from each sensor. Gateways process data and each cluster would transmit this processed information to central command node 102.

Preferably, each gateway computes the ten qualities identified in Equation 10 provided above. If each gateway computes these ten quantities which generally represent a mathematical reformulation of the target location problem, the gateway would exclude those sensors that the gateway decides are not relevant or perhaps sensors that produce incorrect or erroneous target location data or that are just plain faulty. For example, a faulty sensor could generate random bearing estimates that consistently disagree with the bearing estimates of all the other sensors in the cluster. That sensor could be permanently removed from consideration by the gateway. Gateway therefore provides a degree of local management to reject a particular sensor that is unreliable. Therefore, this additional computation and analysis no longer has to be completed at central command node 102 but rather such computation may in part be shifted to clusters 104, 106, and 108 by way of each respective cluster gateway 112, 114, and 116.

Sensor network 100 illustrated in FIG. 5 provides a number of advantages. For example, network 100 utilizes an algorithm for optimally estimating a target location of target 110 using bearing measurements from any number of sensors in a decentralized fashion. In one preferred arrangement, a preferred algorithm minimizes communication across network via transmission links 150, 152, and 154 thereby making network 100 more robust to local failures. That is, in the event that perhaps gateway 114 of second sensor cluster 106 fails, central command node 102 would still receive target information from the other two clusters 104 and 108 via transmission links 152 and 154, respectively.

Gateways 112, 114, and 116 transmit a limited number (i.e., 10) of pre-computed quantities to a central command node 102 which then computes a global target location estimate 110. Central command node 102 derives global target location estimate 110 based on the limited number of pre-computed quantities and without considering the geometric and acoustical details of each cluster. However, there is no approximation involved in the preferred algorithm and the optimal estimate is the one that would be computed if each sensor communicated directly with the central command node 102. This is true since the pre-computed quantities transmitted from the gateways include all the necessary information for solution to target location estimate.

In FIG. 5, bearing sensor clusters 104, 106, and 108 may be included in packages comprising an Unattended Ground Sensor (UGS). UGS measure other quantities in addition to bearing angles to targets. In an alternative arrangement, 10 the arrangement of clusters 104, 106, and 108 may be dependent on deployment types. For example, first cluster 104 could be deployed by a first armed services on a certain date and second cluster 106 could be deployed on a later date. For example, cluster 106 could be deployed by dropping second cluster 106 sensors 132, 134, 136, and 138 from an airborne asset (e.g., a helicopter or plane).

Exemplary embodiments of the present invention have been described. Those skilled in the art will understand, however, that changes and modifications may be made to these embodiments without departing from the true scope and spirit of the present invention, which is defined by the claims.

I claim:

1. A method of computing a location of a first target in a sensor network, said method comprising:

defining a first network cluster with a first plurality of bearing measuring sensors;

operatively coupling said first network cluster to a first gateway;

defining a second network cluster with a second plurality of bearing measuring sensors;

operatively coupling said second network cluster to a second gateway;

operatively coupling said first and said second gateway to a central command node;

computing a first set of pre-computed numbers from said first plurality of measuring sensors and a second set of pre-computed numbers from said second plurality of measuring sensors, said first and second set of pre-computed numbers computed in part based on the following equations:

$$x=[(\Sigma w+\Sigma a^2)(\Sigma b-\Sigma \alpha \beta)+(\Sigma \alpha-\Sigma a)(\Sigma ab-\Sigma \beta)]/D$$

$$y=[(\Sigma v+\Sigma \alpha^2)(\Sigma ab-\Sigma \beta)+(\Sigma \alpha-\Sigma a)(\Sigma b+\Sigma \alpha \beta)]/D$$

where $$D=(\Sigma v+\Sigma \alpha^2)(\Sigma w+\Sigma a^2)+\Sigma \alpha-\Sigma a$$

and $$\Sigma a=a_1/v_1+a_2/v_2+\ldots+a_m/v_m$$

$$\Sigma b=b_1/v_1+b_2/v_2+\ldots+b_m/v_m$$

$$\Sigma a^2=a_1^2/v_1+a_2^2/v_2+\ldots+a_m^2/v_m$$

$$\Sigma ab=a_1b_1/v_1+a_2b_2/v_2+\ldots+a_mb_m/v_m$$

$$\Sigma v=1/v_1+1/v_2+\ldots+1/v_m$$

$$\Sigma \alpha=\alpha_1/w_1+\alpha_2/w_2+\ldots+\alpha_n/w_n$$

$$\Sigma \beta=\beta_1/w_1+\beta_2/w_2+\ldots+\beta_n/w_n$$

$$\Sigma \alpha^2=\alpha_1^2/w_1+\alpha_2^2/w_2+\ldots+\alpha_n^2/w_n$$

$$\Sigma \alpha \beta=\alpha_1\beta_1/w_1+\alpha_2\beta_2/w_2+\ldots+\alpha_n\beta_n/w_n$$

$$\Sigma w=1/w_1+1/w_2+\ldots+1/w_n$$

transmitting said first set of pre-computed numbers representative of information needed for global target location estimation of said first target from said first gateway to said central command node;
transmitting said second set of pre-computed numbers representative of information needed for global target location estimation of the first target from said second gateway to said central command node; and
estimating said location of said first target by said central command node based in part on said first and said second set of pre-computed numbers.

2. The method of claim 1 wherein said first set of pre-computed numbers includes information needed by said central command node to account for all measurements of said first target made by said first plurality of sensors.

3. The method of claim 1 wherein said second set of pre-computed numbers includes information needed by said central command node to account for all measurements of said first target made by said second plurality of sensors.

4. The method of claim 1, further comprising:
utilizing a target location algorithm, said algorithm computes said global target location estimate of said first target based on said first and said second set of pre-computed numbers, said algorithm computing said estimated location of said first target as if each sensor in said first and second cluster transmitted a representative bearing estimate to said central command node.

5. The method of claim 1 further comprising:
transmitting a third set of pre-computed numbers representative of information needed for global target location estimation of a second target from said first gateway to said central command node;
transmitting a fourth set of pre-computed numbers representative of information needed for global target location estimation of said second target from said second gateway to said central command node; and
estimating said location of said second target by said central command node based in part on said third and said fourth set of pre-computed numbers.

6. The method of claim 1 wherein at least one of said first plurality of bearing measuring sensors comprises an acoustic sensor.

7. The method of claim 1 wherein said first set of pre-computed numbers comprises approximately ten pre-computed numbers.

8. The method of claim 1 further comprising;
periodically transmitting said first set of pre-computed numbers from said first gateway to said central command node.

9. The method of claim 1 further comprising:
periodically computing said first target location estimate by said central command node based on said first and said second set of pre-computed numbers.

10. The method of claim 1 further comprising:
computing x and y at the central command node in part based on the following equations:

$$x = \frac{1}{D}\left[\left(\sum_{c=1}^{k}\left(\sum w\right) + \sum_{c=1}^{k}\left(\sum a^2\right)\right)\left(\sum_{c=1}^{k}\left(\sum b\right) + \sum_{c=1}^{k}\left(\sum \alpha\beta\right)\right) + \right.$$
$$\left.\left(\sum_{c=1}^{k}\left(\sum v\right) - \sum_{c=1}^{k}\left(\sum a\right)\right)\left(\sum_{c=1}^{k}\left(\sum ab\right) + \sum_{c=1}^{k}\left(\sum \beta\right)\right)\right]$$

$$y = \frac{1}{D}\left[\left(\sum_{c=1}^{k}\left(\sum v\right) + \sum_{c=1}^{k}\left(\sum a^2\right)\right)\left(\sum_{c=1}^{k}\left(\sum ab\right) - \sum_{c=1}^{k}\left(\sum \beta\right)\right) + \right.$$
$$\left.\left(\sum_{c=1}^{k}\left(\sum a\right) - \sum_{c=1}^{k}\left(\sum a\right)\right)\left(\sum_{c=1}^{k}\left(\sum b\right) + \sum_{c=1}^{k}\left(\sum \alpha\beta\right)\right)\right].$$

11. The method of claim 9 further comprising:
computing D at the central command node in part based on the following equation:

$$D = \left(\sum_{c=1}^{k}\left(\sum v\right) + \sum_{c=1}^{k}\left(\sum a^2\right)\right)\left(\sum_{c=1}^{k}\left(\sum w\right) + \sum_{c=1}^{k}\left(\sum a^2\right)\right) + $$
$$\sum_{c=1}^{k}\left(\sum a\right) - \sum_{c=1}^{k}\left(\sum a\right).$$

* * * * *